Patented Feb. 9, 1937

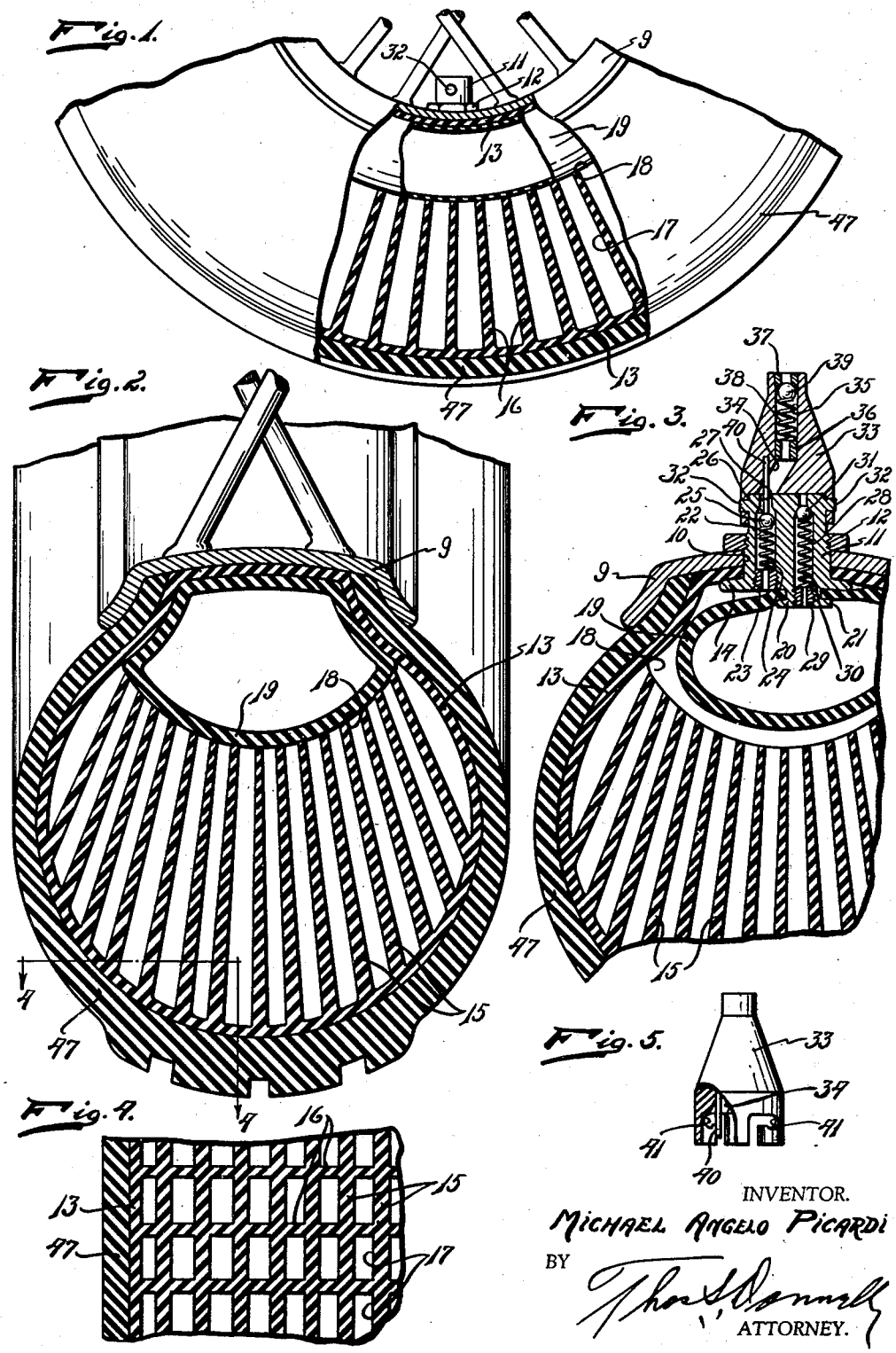

2,070,066

UNITED STATES PATENT OFFICE 2,070,066

PNEUMATIC TUBE

Michael Angelo Picardi, Philadelphia, Pa.

Application May 7, 1934, Serial No. 724,383

2 Claims. (Cl. 152—22)

My invention relates to a new and useful improvement in a pneumatic tube and has for its object the provision of a tube having an inner tube so arranged and constructed that a large number of individual cells or compartments are formed in the tube capable of being inflated with air and when inflated closed at their upper ends from inter-communication by an inflated inner tube so that a puncture of a tire to cause complete deflation of the tire is rendered practically impossible.

Another object of the invention is the provision of a tire inner tube having a plurality of circumferentially spaced partitions and a plurality of spaced transversely extending partitions dividing the tube into a plurality of separate compartments.

Another object of the invention is the provision of a pneumatic tire inner tube having a plurality of separate compartments opening at their upper ends and provided with an inflatable tube lying in said space so arranged and constructed that when inflated it will serve as a closure for the upper ends of said compartments and seal them against communication.

Another object of the invention is the provision of an inflating valve which may be selectively used for inflating the separate compartments or the sealing tube.

Other objects will appear hereinafter.

The invention consists in the combination and arrangement of parts hereinafter described and claimed.

The invention will be best understood by a reference to the accompanying drawing which forms a part of this specification, and in which, Fig. 1 is a fragmentary side elevational view of the invention showing it mounted on a vehicle wheel with a part of the invention broken away and shown in section.

Fig. 2 is a transverse sectional view of the invention showing the invention mounted on a vehicle wheel.

Fig. 3 is a fragmentary transverse sectional view of the invention taken on the inflating valve.

Fig. 4 is a sectional view taken on line 4—4 of Fig. 2.

Fig. 5 is a prospective view of the valve cover or head with a part broken away and a part shown in section.

In the drawing I have illustrated the invention applied to a vehicle wheel having the tire rim 9 provided with an opening 10 through which the tubular valve housing 11 may project. A nut 12 is secured on this valve housing for securing the wheel in position.

This housing also projects through the rubber casing or tubular tire 13. The tubular housing is provided with a head 14 which clamps against the tube 13. This tube 13 is shown enclosed by the casing 47 having at its base the increased thickness to provide a tread. Extending longitudinally of the tube 13 are partitions 15 which are formed of rubber and integral with the tube 13. The partitions 15 are positioned between the transversely extending partitions 16 so as to provide a honeycomb construction in cross section as shown in Fig. 4, thus, forming a plurality of separate non-communicating compartments 17. These compartments are open at their upper end and open into the space 18. Positioned in this space 18 is an endless annular rubber tube 19. An extension 20 on one side of the valve housing 11 is projected through the tube 19 and is provided with a head 21 which clamps against the tube.

Formed in the housing 11 is a passage 22 threaded into the lower end of which is a plug 23 and securing the spring 24 in this passage so as to normally press the ball 25 into the pocket 26 to close the upper end 27 of the passage. A similar passage 28 is formed in the housing 11 and provided with a screw plug 29 securing the spring 30 and the ball 31 in position.

Projecting outwardly from opposite sides of the housing 11 are the trunnions 32. A cap 33 is adapted for mounting on the housing 11. This cap 33 is provided with a passage 34 communicating with the axially directed passage 35 in which is positioned the plugs 36 and 37 and the spring 38 and the ball 39. This cap 33 also carries the plunger 40, formed in the cap 33 are the bayonet slots 41 adapted to receive the trunnions 32. The upper end of the passages 27 and 28 are elongated so that when the cap is placed in position and threaded to lock it thereon, the pin 40 will ride into position for forcing the balls 31 or 25 off the seat depending upon which position the cap is in when placed on the valve housing 11. When the cap is in the position shown in Fig. 3 air delivered through the passage 35 will serve to deflate the compartment 17 and fill the space 18. When this part of the tube is properly inflated, the cap 33 may be removed and replaced after being threaded through 180° so that the pin 40 will force the ball 31 off its seat. Air delivered through the passage 35 will then serve to inflate the tube 19 and force it outwardly in the position shown in Fig. 2. It will be noted that when the tube 19 is properly inflated so as to form the position shown in Fig. 2 this tube will serve to form a closure for the upper end of the compartments 17, consequently, it is obvious that if one of the compartments should be punctured the other compartments would not be deflated and the effect of a puncture in the tube would, thus, be reduced to a minimum. It is obvious that even with a large number of the chambers 17 punctured, the tube would still remain in a substantially inflated condition and remain serviceable. It is obvious that the size of the tube 19 may vary as its principal function is to form a closure. It is believed apparent also that this tube will also function as a pneumatic cushion for the wheel. In fabricating a tube of this kind the construction may be economically carried on by molding the various partitions 15 and 16 integral with the casing 13. It is obvious that the casing 13 would be left unfinished until the insertion of the tube 19 whereupon the meeting edges of the casing 13 could be vulcanized together.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. An inner tube for pneumatic tires comprising: an inflatable annular tubular body; a plurality of transverse partitions and a plurality of circumferential partitions in said body, said partitions being located in the tread portion of said body only, and intersecting each other to provide a plurality of open ended cells, the portion of said body below said partitions being free of said partitions and in communication with the open ends of the cells; means for inflating said body member; and means within said free space for sealing the open ends of said cells.

2. An inner tube for pneumatic tires comprising: an inflatable annular tubular body; a plurality of transverse partitions and a plurality of circumferential partitions in said body, said partitions being located in the tread portion of said body only and intersecting each other to provide a plurality of open ended cells, the portion of said body below said partitions being free of said partitions and in communication with the open ends of the cells; means for inflating said body member; and means within said free space for sealing the open ends of said cells, said sealing means comprising a flexible tubular member adapted for inflation to close the open ends of said cells.

MICHAEL ANGELO PICARDI.